(12) United States Patent
Suzuki

(10) Patent No.: US 7,568,806 B2
(45) Date of Patent: Aug. 4, 2009

(54) LIGHT SOURCE UNIT HAVING A LIGHT SOURCE IN A MIRROR TUNNEL

(75) Inventor: Yukio Suzuki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 418 days.

(21) Appl. No.: 11/294,698

(22) Filed: Dec. 5, 2005

(65) Prior Publication Data

US 2006/0126686 A1 Jun. 15, 2006

(30) Foreign Application Priority Data

Dec. 14, 2004 (JP) ............................. 2004-361500

(51) Int. Cl.
| | |
|---|---|
| G03B 21/26 | (2006.01) |
| G03B 21/28 | (2006.01) |
| G03B 21/22 | (2006.01) |
| F21V 7/04 | (2006.01) |
| H01L 33/00 | (2006.01) |
| G02B 6/00 | (2006.01) |

(52) U.S. Cl. .............................. 353/37; 353/51; 353/78; 353/99; 362/612; 362/555; 385/133

(58) Field of Classification Search .................... 353/37, 353/50, 51, 77, 78, 98, 99; 362/612, 555; 348/771; 385/133
See application file for complete search history.

(56) References Cited

U.S. PATENT DOCUMENTS 7,222,974 B2   5/2007   Tomita

2004/0207816 A1 *  10/2004  Omoda et al. ................. 353/31
2005/0174771 A1 *  8/2005   Conner ........................ 362/244
2005/0248732 A1 *  11/2005  Tomita ........................ 353/94

FOREIGN PATENT DOCUMENTS

JP          11-142780 A       5/1990

(Continued)

OTHER PUBLICATIONS

Japanese Office Action dated Dec. 2, 2008 and English translation thereof issued in a counterpart Japanese Application. Application No. 2004-361500.

(Continued)

*Primary Examiner*—Diane I Lee
*Assistant Examiner*—Magda Cruz
(74) *Attorney, Agent, or Firm*—Frishauf, Holtz, Goodman & Chick, P.C.

(57) ABSTRACT

A light source unit includes a mirror tunnel which has a prism-like shape and whose external sides are formed to taper, and a light source which includes a light emitting device and which is disposed on a side of the mirror tunnel. A reflecting mirror is provided at a first end face of the mirror tunnel, and a second end face of the mirror tunnel, that lies on an opposite side from the first end face, is an end face from which light is emitted, and has an area wider than that of the first end face. The light emitting device of the light source includes red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

4 Claims, 5 Drawing Sheets

FOREIGN PATENT DOCUMENTS

| | | |
|---|---|---|
| JP | 03-210548 A | 9/1991 |
| JP | 08-111107 A | 4/1996 |
| JP | 2003-057602 A | 2/2003 |
| JP | 2003-262795 A | 9/2003 |
| JP | 2004-063335 A | 2/2004 |
| JP | 2004-184611 A | 7/2004 |
| JP | 2004-205783 A | 7/2004 |
| JP | 2004-318025 A | 11/2004 |
| JP | 2005-114977 A | 4/2005 |

OTHER PUBLICATIONS

Japanese Office Action (and English translation thereof) dated Sep. 24, 2008, issued in a counterpart Japanese Application.

* cited by examiner

LIGHT SOURCE UNIT HAVING A LIGHT SOURCE IN A MIRROR TUNNEL

BACKGROUND OF THE INVENTION

1. Technical Field of the Invention

The present invention relates to a light source unit and a projector system including the light source unit, and more particularly to a light source unit which enables the installation of a number of LED's therein as light sources and which is made small in size by increasing the utilization efficiency of light emitted from the LED's so installed and a projector system including the light source unit.

2. Description of Related Art

While many high pressure mercury lamps were used in light sources for projector systems, the high pressure mercury lamps had problems of large power consumption and short lives. Due to this, in recent years, light emitting diodes (LED's) have been in use instead due to small power consumption and long lives, as well as low heat generation, which less affects peripheral equipment.

FIG. 7 is a schematic diagram which illustrates an example of a conventional projector system including a light source unit which uses LED's as light sources. A light source unit 31 provided in a projector system 30 is made up of a long transparent quadrangular prism-shaped mirror tunnel 32 and a light source 33 provided at one end of the mirror tunnel 32 which is made up of red, green and blue LED's. The LED's in the respective colors which make up the light source 33 are arranged in arrays.

A lens 34 is provided on an optical axis K near the other end of the mirror tunnel 32 where the light source 33 is not provided.

A reflector 35 is disposed on the optical axis K in a direction in which light emerging from the lens 34 travels in such a way that a surface of the reflector 35 which is to be illuminated by light so traveling is angled at a predetermined angle relative to the optical axis K.

A micromirror device (a Digital Micromirror Device or DMD) 36 is disposed on the optical axis K in a direction in which light is reflected by the reflector 35. A projection lens 37 is disposed on the optical axis K in a direction in which light is reflected by the micromirror device 36. The projector system 30 is adapted to project an image by causing the respective red, green and blue LED's to emit light in the relevant colors in accordance with color indications by the micromirror element 36 for split indication of the respective colors.

SUMMARY OF THE INVENTION

According to an aspect of the invention, there is provided a light source unit including a mirror tunnel which has a prism-like shape and whose external sides are formed to taper, a light source which includes a light emitting device and which is disposed on a side of the mirror tunnel, and a reflecting mirror provided at a first end face of the mirror tunnel, wherein a second end face of the mirror tunnel, that lies on an opposite side from the first end face, is an end face from which light is emitted, and has an area wider than that of the first end face, and wherein the light emitting device of the light source comprises red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

In addition, according to another aspect of the invention, there is provided a light source unit including a mirror tunnel which is formed into a quadrangular pyramid shape, and a light source which includes a light emitting device and which is disposed on a side of the mirror tunnel, wherein an end face of the mirror tunnel which lies on an opposite side from a vertex of the quadrangular pyramid shape of the mirror tunnel is the end face from which light is emitted, and wherein the light emitting device of the light source comprises red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

Additionally, according to a further aspect of the invention, there is provided a projector system including a light source unit which includes, in turn, a mirror tunnel which has a prism-like shape and whose external sides are formed to taper, a light source which includes a light emitting device and which is disposed on a side of the mirror tunnel, and a reflecting mirror which is provided at a first end face of the mirror tunnel, a condenser which gathers light that emerges from the mirror tunnel, a reflector which reflects light that emerges from the condenser, a micromirror device which receives light reflected by the reflector so as to project an image, and a projection lens which enlarges the image projected from the micromirror device, wherein the second end face of the mirror tunnel, that lies on an opposite side from the first end face, is an end face from which light is emitted and has an area wider than that of the first end face, and wherein the light emitting device of the light source includes red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction. Furthermore, according to another aspect of the invention, there is provided a projector system including a light source unit which includes, in turn, a mirror tunnel which is formed into a quadrangular pyramid shape and a light source that includes a light emitting device and that is disposed on a side of the mirror tunnel, a condenser which gathers light that emerges from the mirror tunnel, a reflector which reflects light that emerges from the condenser, a micromirror device which receives light reflected by the reflector so as to project an image, and a projection lens which enlarges the image projected from the micromirror device, wherein an end face of the mirror tunnel which lies on an opposite side from a vertex of the quadrangular pyramid shape of the mirror tunnel is the end face from which light is emitted, and wherein the light emitting device of the light source includes red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

According to the invention, since the light emitting device is made to be attached to the side of the mirror tunnel, a required amount of light can be secured without enlarging the mirror tunnel itself.

DESCRIPTION OF PREFERRED EMBODIMENTS

First Embodiment

Next, a first embodiment of the invention will be described by reference to the drawings. Claims are, however, not limited by an illustrated example.

Figure 1:
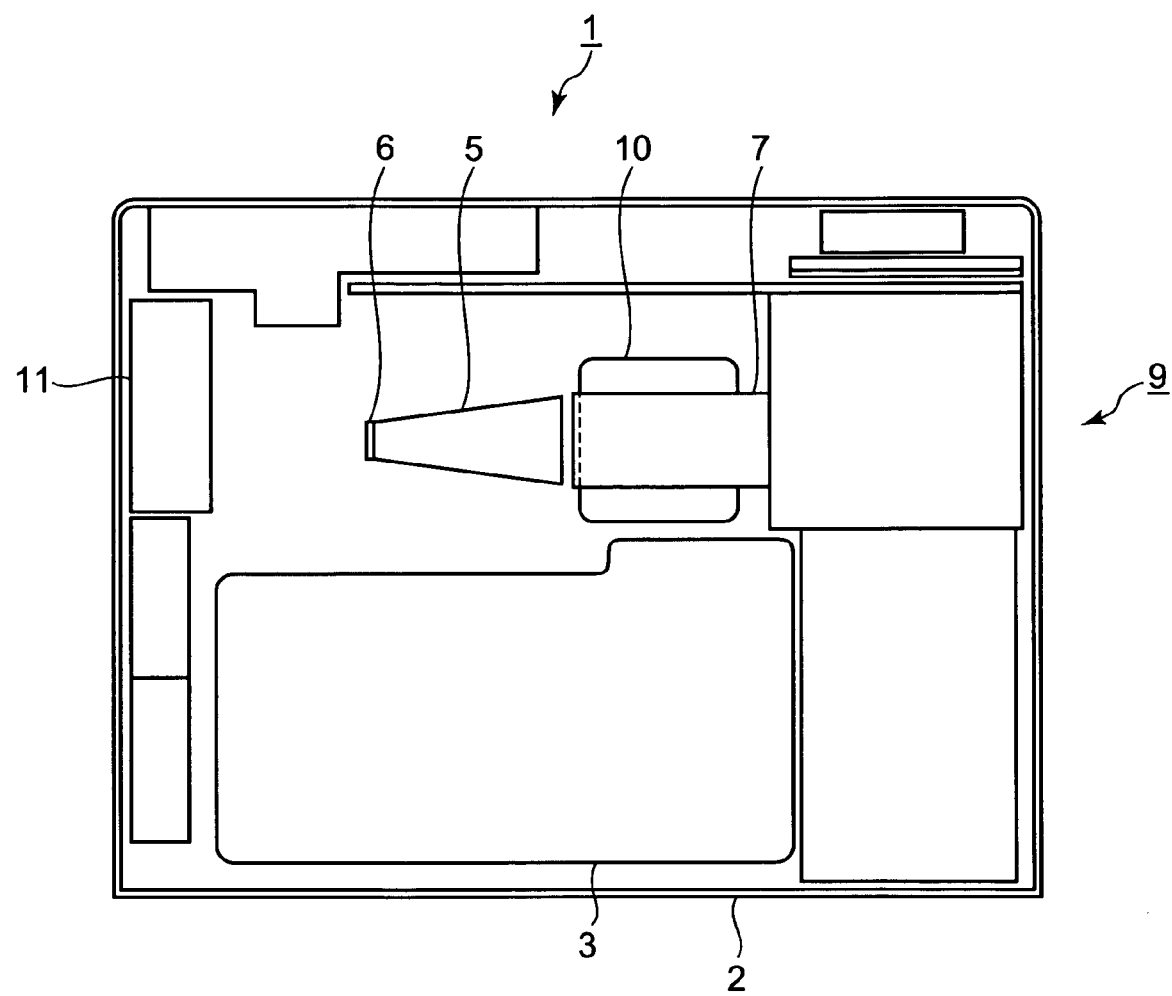
FIG. 1 is a top sectional view of a projector system according to a first embodiment of the invention.

FIG. 1 is a top sectional view of a projector system 1. A case 2 is provided on the projector system 1, and a power supply circuit board 3 having a power supply mounted thereon is provided in the interior of the projector system 1 for controlling the whole of the projector system 1. In addition, a mirror tunnel 5, on which LED's functioning as a light source are mounted, is disposed near a central portion of the projector system, and a reflector 6 is mounted on the mirror tunnel 5. A lens 7 is disposed in a direction in which light emerging from the mirror tunnel 5 travels. A projection unit 9, which will be described later on, is disposed in a direction in which light emerging from the lens 7 travels, and a reflector 13, a micromirror device 14 and a projection lens 15 are accommodated in the projection unit 9.

In addition, a multiblade fan 10 is disposed in the projector system 1 which is a cooling fan for blowing cooling air against the LED's mounted on the mirror tunnel 5 so as to cool them. An axial fan 11 is provided in a backward direction of the reflector 6 mounted on the mirror tunnel 5 for producing an air flow on the periphery of the mirror tunnel 5.

Figure 2:
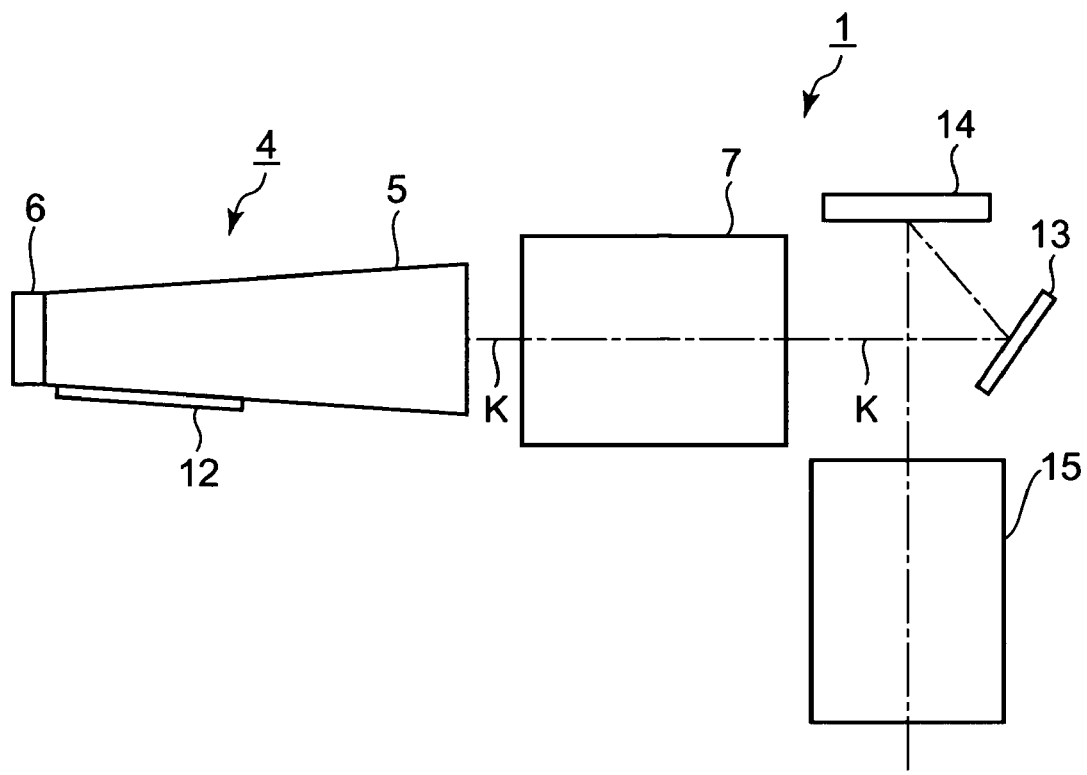
FIG. 2 is a schematic diagram which shows the configuration of the projector according to the first embodiment.

FIG. 2 is a schematic diagram which shows a configuration inside the projector system 1. A light source unit 4 is provided in the projector system 1. The light source unit 4 is made up of the mirror tunnel 5, the reflector 6 that is provided on an end face of the mirror tunnel 5 and the light source 12 that are mounted on the mirror tunnel 5.

The mirror tunnel 5 is such as to be designed to guide light emitted from the light source 12 and is made of a transparent material. The mirror tunnel 5 has a prism-like shape and external sides thereof are formed to taper, and the reflector 6 is provided on an end face of the mirror tunnel 5 of which the area is smaller in such a manner that a reflecting surface of the reflector 6 is brought into contact with the end face of the mirror tunnel 5.

The lens 7 is provided on an optical axis K near the other end of the mirror tunnel 5 where the reflector 6 is not provided so as to enlarge a bundle of rays that emerges from the mirror tunnel 5.

The projection unit 9 is disposed in a direction in which light emerges from the lens 7 to travel further, and the reflector 13, which makes up the projection unit 9, is disposed on the optical axis K of light that has emerged from the lens 7 in such a manner that a surface thereof which is illuminated by the light that has emerged from the lens 7 has a predetermined angle relative to the optical axis K.

The micromirror device 14 is disposed on the optical axis K in a direction in which light is reflected by the reflector 13. The projection lens 15 is disposed on the optical axis K of light that is reflected by the micromirror device 14.

The light source 12 is made up of a light emitting device, and there is no limitation on the type of the light emitting device, provided that the light emitting device is such as to provide a quantity of light that is required at the light source unit and the projector system. As the light emitting device, for example, an LED is raised. In the following description, a case will be described in which LED's are used as light sources.

Figure 3:
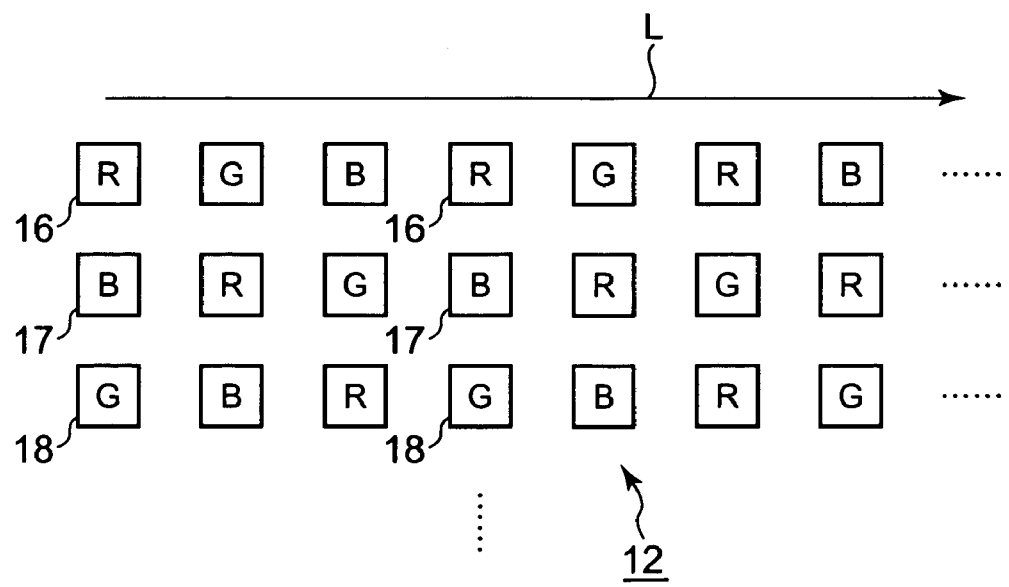
FIG. 3 is an exemplary diagram which shows LED's making up a light source provided on a side of a mirror tunnel used in the first embodiment.

As shown in FIG. 3, the light source 12 is disposed on a side of the mirror tunnel 5, and in the light source 12, red LED's 16, green LED's 17 and blue LED's 18 are disposed along a longitudinal axis L or a longitudinal direction L and a direction which intersects with the longitudinal axis L at right angles in such a manner that the LED's in the same color are not adjacent to each other in both the directions. The respective LED's are disposed in such a manner as to be spaced apart from each other at such a distance that no adverse effect is imparted to the adjacent LED's by heat generated when the LED's are caused to emit light.

The LED's are designed to be provided on a side of the mirror tunnel 5, and the LED's are preferably disposed over an area of not less than a quarter or one-half the total area of the side at predetermined intervals and are most preferably disposed over the whole area of the side at the predetermined intervals.

Note that while the light source 12 is mounted on only the one side of the mirror tunnel in FIG. 2, the mounting of the light source 12 on the mirror tunnel 5 is not limited to one side of the mirror tunnel 5 but the light source 12 may be provided on a plurality of sides of the mirror tunnel 5.

The respective LED's, which make up the light source 12, are made to synchronize with an image display timing of the micromirror device 14. The micromirror device 14 is designed to display a red image when the red LED's are lighted and when the green LED's and blue LED's are lighted, the mircromirror device 14 displays images corresponding to the respective colors.

In addition to the individual lighting of the red LED's, the green LED's and the blue LED's, the respective LED's, which make up the light source 12, are also designed to be lighted altogether at the same time to produce white light when brightness is necessary for an image to be displayed, and the micromirror device 14 is also designed to operate to display an image which corresponds thereto.

The lens 7 is such as to guide light emerging from the mirror tunnel 5 to the reflector 13. While the lens 7 is illustrated as a single lens element in FIGS. 1 and 2, the lens 7 may be made up of a plurality of lens elements.

The reflector 13 is such as to reflect light that is guided to be incident thereon by the lens 7 and guide light so reflected towards the direction of the mircromirror device 14.

The micromirror device 14 is such as to project an image by forming individual pixels for an image to be displayed by a plurality of micromirrors and changing over light and shade of the pixels by changing over the inclination of the micromirrors.

The micromirrors are formed of extremely thin metallic pieces such as aluminum pieces and have vertical and horizontal widths which range from 10 µm to 20 µm. These micromirrors are provided, respectively, on a plurality of mirror drive devices (not shown) such as CMOS which are formed into a matrix-like arrangement in row and column directions.

The projection lens 15 is such as to enlarge and project reflected light from the micromirror device 14 on to a screen (not shown). Note that the projection lens 15 is illustrated as a single lens element in FIG. 2, the projection lens 15 may be made up of a plurality of lens elements.

Next, the function of the first embodiment will be described.

Figure 4:
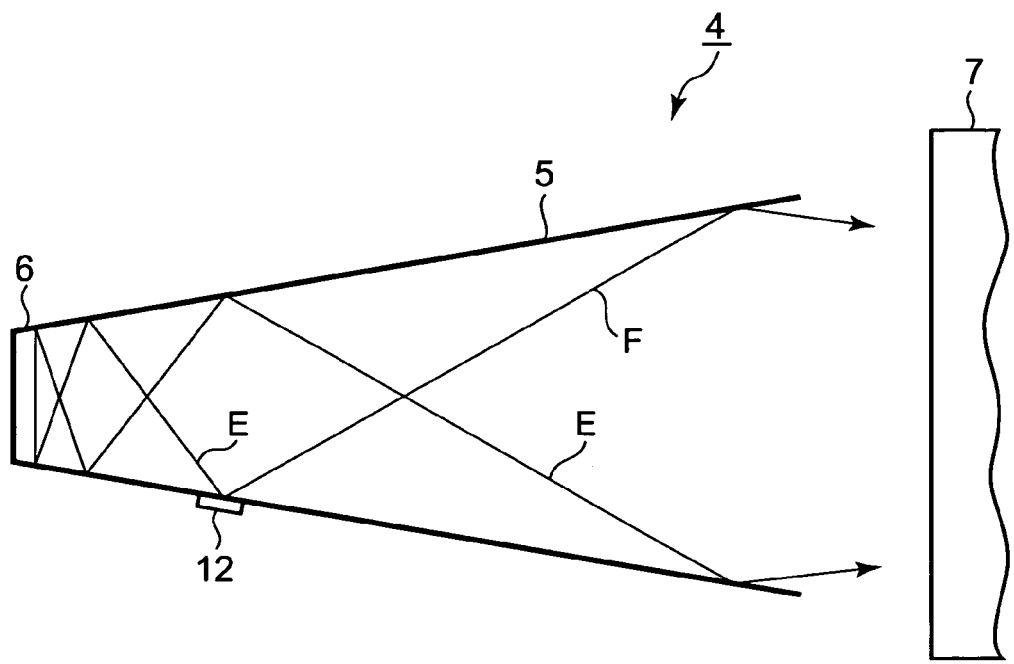
FIG. 4 is a schematic sectional view of the mirror tunnel which shows optical paths of light within the mirror tunnel used in the first embodiment.

When the projector system 1 is activated, light is emitted from the light source 12 provided on the side of the mirror tunnel 5. FIG. 4 is a schematic diagram which shows optical paths of light emitted from one of the LED's which make up the light source 12 with a view to clarifying optical paths of light emitted from the light source 12. As shown in FIG. 4, part E of light emitted from the LED making up the light source 12 is emitted towards the direction of the reflector 6, then impinges on side walls of the mirror tunnel 5 and is thereafter reflected towards the direction of the side where the light source 12 is provided. Thus, the part E of light repeats these reflections and is eventually guided towards the direction of the lens 7. In addition, the other part F of the light emitted from the LED making up the light source 12 impinges on a side of the mirror tunnel 5 which oppositely faces the side where the light source 12 is disposed to thereby be reflected thereon and is thereafter guided towards the direction of the lens 7.

Thus, the parts E and F, which constitute part of the light emitted from the light source 12, are to be caused to emerge from the mirror tunnel 5 at a smaller angle relative to an interface between the sides of the mirror tunnel 5 and layers of outside air compared with a case where light is caused to emerge from a quadrangular prism-shaped mirror tunnel having a square cross section.

Light emerging from the mirror tunnel 5 is gathered by the lens 7 and is then caused to be incident on the reflector 13. Light so incident on the reflector 13 is reflected so as to be guided towards the micromirror device 14. Light that is caused to be incident on the micromirror device 14 is enlarged by the projection lens 15 and is then projected on to the screen, not shown.

Thus, as has been described heretofore, according to the projector system of the first embodiment of the invention, a required quantity of light can be secured without enlarging the mirror tunnel itself.

In addition, since by forming the shape of the mirror tunnel 5 into a taper shape so that the cross sectional area of the mirror tunnel 5 is expanded from the one end face to the other thereof, a ratio of quantity of usable light of light that emerges from a light emerging surface of the mirror tunnel 5 can be increased, it is possible to provide a light source unit which can obtain a more sufficient quantity of light.

In addition, since irregularities in color of light projected by the micromirror device which are generated when white light is emitted can be reduced even when white light is emitted by the LED's, it is possible to obtain a clear image.

Additionally, since the mirror tunnel 5 is formed to taper in such a manner that the cross sectional area thereof expands from the one end face to the other thereof, the area of the light emerging surface of the mirror tunnel 5 becomes wide, whereby a usable range of light emitted from the LED's can be expanded.

Second Embodiment

Next, a second embodiment of the invention will be described. However, in the description of the second embodiment, only those which differ from the first embodiment will be described, and the description of the same configurations as those of the first embodiment will be omitted here.

Figure 5:
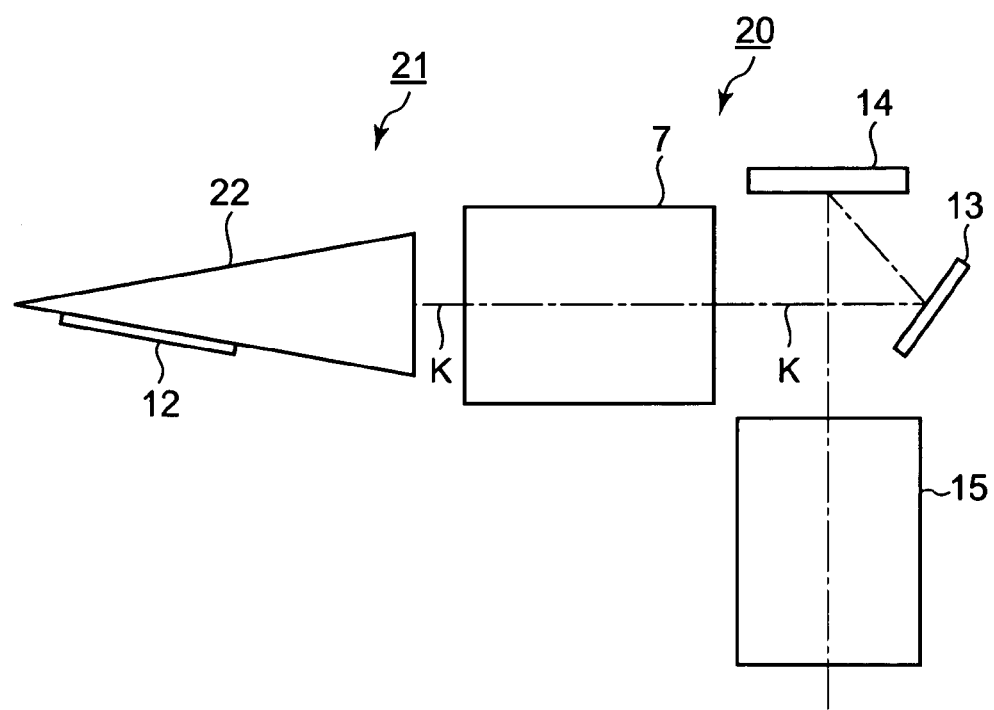
FIG. 5 is a schematic diagram which shows the configuration of the projector according to a second embodiment.

FIG. 5 is a schematic diagram which shows the configuration within a projector system 20. A light source unit 21 is provided in the projector system 20, and the light source unit 21 is made up of a mirror tunnel 22 and a light source 12 mounted on the mirror tunnel 22.

The mirror tunnel 22 is such as to guide light emitted from the light source 12 to a lens 7 and is made of a transparent material. The mirror tunnel 22 is formed into a quadrangular pyramid shape.

The light source 12 made up of LED's is disposed on a side of the mirror tunnel 22, and in the light source 12, red LED's 16, green LED's 17 and blue LED's 18 are disposed along a longitudinal axis L and in a direction which intersects with the longitudinal axis L at right angles in such a manner that the LED's in the same color are not adjacent to each other in both the directions. The respective LED's are disposed in such a manner as to be spaced apart from each other at such a distance that no adverse effect is imparted to the adjacent LED's by heat generated when the LED's are caused to emit light.

The LED's are designed to be provided on a side of the mirror tunnel 22, and the LED's are preferably disposed over an area of not less than a quarter or one-half the total area of the side at predetermined intervals and are most preferably disposed over the whole area of the side at the predetermined intervals.

The respective LED's, which make up the light source 12, are made to synchronize with an image display timing of a micromirror device 14. The micromirror device 14 is designed to display a red image when the red LED's are lighted and when the green LED's and blue LED's are lighted, the mircromirror device 14 displays images corresponding to the respective colors.

In addition to the individual lighting of the red LED's, the green LED's and the blue LED's, the respective LED's, which make up the light source 12, are also designed to be lighted altogether at the same time to produce white light when brightness is necessary for an image to be displayed, and the micromirror device 14 is also designed to operate to display an image which corresponds thereto.

Next, the function of the second embodiment will be described.

Figure 6:
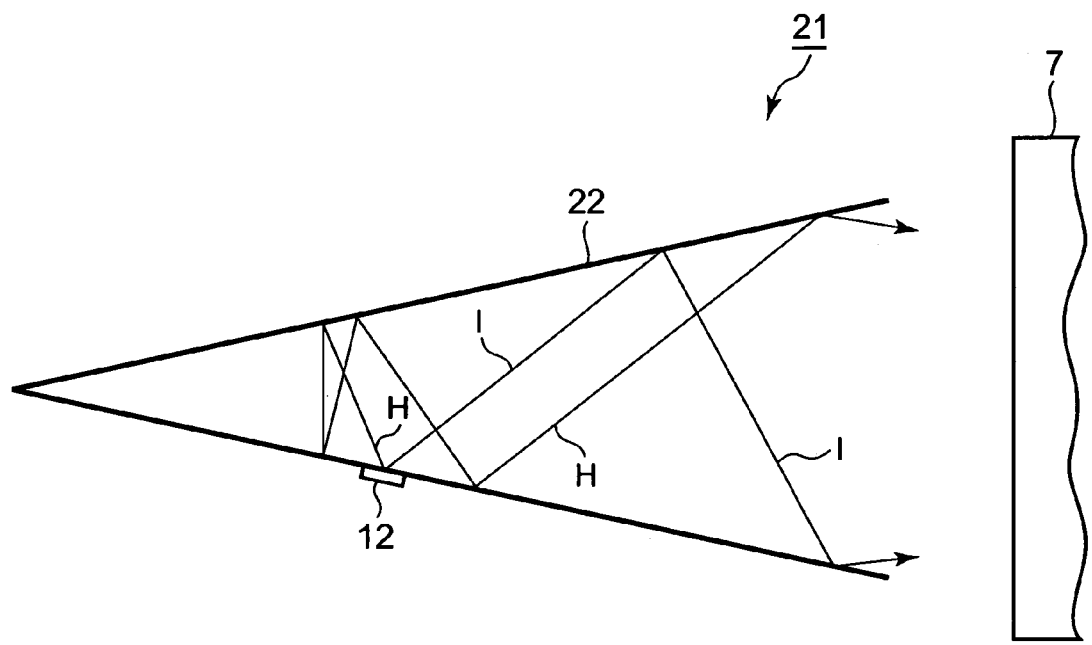
FIG. 6 is a schematic sectional view of the mirror tunnel which shows optical paths of light within the mirror tunnel used in the second embodiment.
Figure 7:
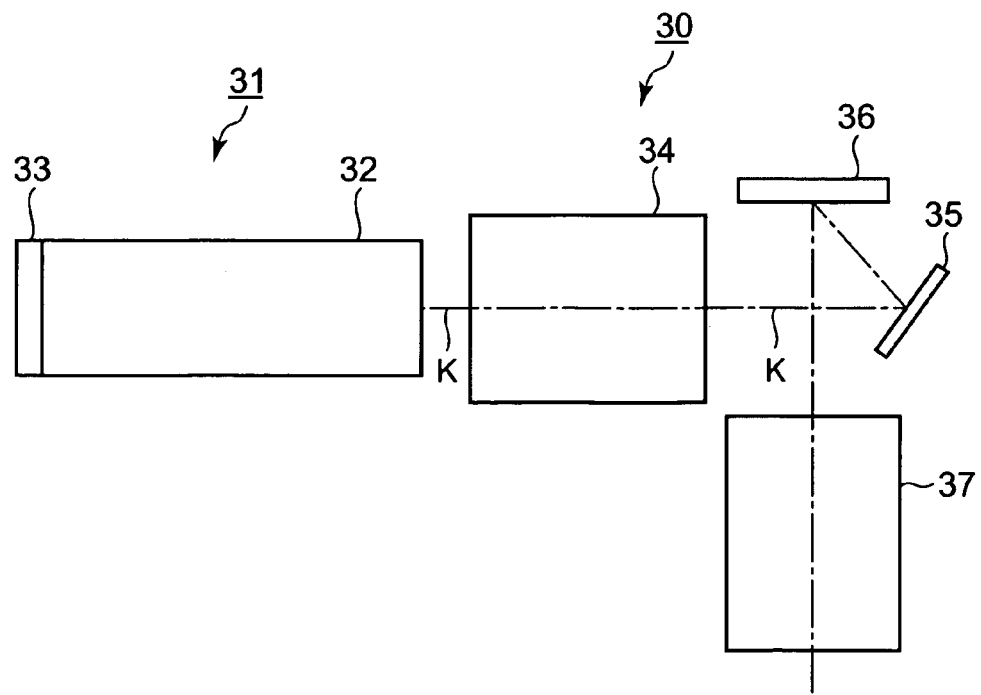
FIG. 7 is a schematic sectional view of a conventional projector.
Figure 8:
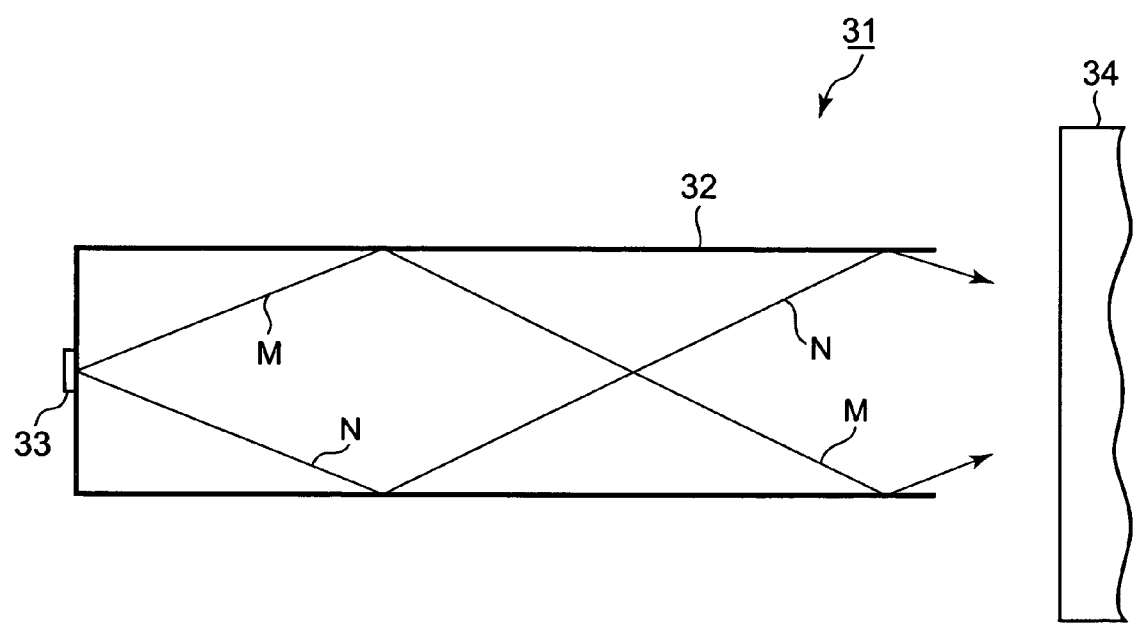
FIG. 8 is a schematic sectional view of a conventional mirror tunnel which shows optical paths of light within the mirror tunnel.

When the projector system 20 is activated, light is emitted from the light source 12 provided on the side of the mirror tunnel 22. FIG. 6 is a schematic diagram which shows optical paths of light emitted from one of the LED's which make up the light source 12 with a view to clarifying optical paths of light emitted from the light source 12.

As shown in FIG. 6, part H of light emitted from the LED making up the light source 12 is emitted towards an opposite direction to the lens 7, then impinges on side walls of the mirror tunnel 22 and is thereafter reflected towards the direction of the side where the light source 12 is provided. Thus, the part H of light repeats these reflections and is eventually guided towards the direction of the lens 7. In addition, a part I which is the other part of the light emitted from the LED making up the light source 12 impinges on a side of the mirror tunnel 22 which oppositely faces the side where the light source 12 is disposed to thereby be reflected thereon and is thereafter guided towards the direction of the lens 7.

Thus, as in the case with the mirror tunnel 5 used in the first embodiment, the parts H and I, which constitute part of the light emitted from the light source 12, are to be caused to emerge from the mirror tunnel 22 at a smaller angle relative to an interface between the sides of the mirror tunnel 22 and layers of outside air compared with a case where light is caused to emerge from a quadrangular prism-shaped mirror tunnel having a square cross section.

Light emerging from the mirror tunnel 22 is gathered by the lens 7 and is then caused to be incident on the reflector 13. Light so incident on the reflector 13 is reflected so as to be guided towards the micromirror device 14. Light that is caused to be incident on the micromirror device 14 is enlarged by a projection lens 15 and is then projected on to the screen, not shown.

Thus, as has been described heretofore, according to the projector system of the second embodiment of the invention, the same advantage as that of the first embodiment can be obtained.

The invention claimed is:

1. A light source unit comprising:
a mirror tunnel which has a prism-like shape and whose external sides are formed to taper;
a light source which comprises a light emitting device and which is disposed on a side of the mirror tunnel; and
a reflecting mirror which is provided at a first end face of the mirror tunnel;
wherein a second end face of the mirror tunnel, that lies on an opposite side from the first end face, is an end face from which light is emitted, and has an area wider than that of the first end face, and
wherein the light emitting device of the light source comprises red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

2. A light source unit comprising:
a mirror tunnel which is formed into a quadrangular pyramid shape; and
a light source which comprises a light emitting device and which is disposed on a side of the mirror tunnel,
wherein an end face of the mirror tunnel which lies on an opposite side from a vertex of the quadrangular pyramid shape of the mirror tunnel is the end face from which light is emitted, and
wherein the light emitting device of the light source comprises red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

3. A projector system comprising:
a light source unit including a mirror tunnel which has a prism-like shape and whose external sides are formed to taper, a light source which includes a light emitting device and which is disposed on a side of the mirror tunnel, and a reflecting mirror which is provided at a first end face of the mirror tunnel;
a condenser which gathers light that emerges from the mirror tunnel;
a reflector which reflects light that emerges from the condenser;
a micromirror device which receives light reflected by the reflector so as to project an image; and
a projection lens which enlarges the image projected from the micromirror device,
wherein a second end face of the mirror tunnel, that lies on an opposite side from the first end face, is an end face from which light is emitted and has an area wider than that of the first end face, and
wherein the light emitting device of the light source includes red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

4. A projector system comprising:
a light source unit including a mirror tunnel which is formed into a quadrangular pyramid shape and a light source that includes a light emitting device and that is disposed on a side of the mirror tunnel;
a condenser which gathers light that emerges from the mirror tunnel;
a reflector which reflects light that emerges from the condenser;
a micromirror device which receives light reflected by the reflector so as to project an image; and
a projection lens which enlarges the image projected from the micromirror device,
wherein an end face of the mirror tunnel which lies on an opposite side from a vertex of the quadrangular pyramid shape of the mirror tunnel is the end face from which light is emitted, and
wherein the light emitting device of the light source includes red LED's, blue LED's and green LED's, and the LED's are disposed on the side of the mirror tunnel such that the LED's of the same color do not lie adjacent to each other in a longitudinal direction of the mirror tunnel and a direction which is at right angles to the longitudinal direction.

* * * * *